US012058052B2

(12) United States Patent
Khosravi

(10) Patent No.: US 12,058,052 B2
(45) Date of Patent: *Aug. 6, 2024

(54) TRAFFIC ESTIMATIONS FOR BACKBONE NETWORKS

(71) Applicant: Amazon Technologies, Inc., Reno, NV (US)

(72) Inventor: Atefeh Khosravi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/965,639

(22) Filed: Oct. 13, 2022

(65) Prior Publication Data

US 2023/0104069 A1 Apr. 6, 2023

Related U.S. Application Data

(63) Continuation of application No. 17/106,678, filed on Nov. 30, 2020, now Pat. No. 11,489,780.

(51) Int. Cl.
*H04L 47/2441* (2022.01)
*H04L 43/062* (2022.01)
(Continued)

(52) U.S. Cl.
CPC ........ *H04L 47/2441* (2013.01); *H04L 43/062* (2013.01); *H04L 43/0882* (2013.01);
(Continued)

(58) Field of Classification Search
CPC ... H04L 47/32; H04L 47/2441; H04L 43/062; H04L 43/08; H04L 43/0882;
(Continued)

(56) References Cited

U.S. PATENT DOCUMENTS 6,873,600 B1 3/2005 Duffield
7,664,048 B1 2/2010 Yung
(Continued)

OTHER PUBLICATIONS

Non-Final Rejection issued in U.S. Appl. No. 17/106,678, dated Dec. 21, 2021.
(Continued)

*Primary Examiner* — Mohamed A Kamara
(74) *Attorney, Agent, or Firm* — Hogan Lovells US LLP

(57) ABSTRACT

Traffic flow across a backbone network can be determined even though flow data may not be available from all network devices. Flow data can be observed using types of backbone devices, such as aggregation and transit devices. An algorithm can be applied to determine which data to utilize for flow analysis, where this algorithm can be based at least in part upon rules to prevent duplicate accounting of traffic being observed by multiple devices in the backbone network. Such an algorithm can use information such as source address, destination address, and region information to determine which flow data to utilize. In some embodiments, address mapping may be used to attribute this traffic to various services or entities. The data can then be analyzed to provide information about the flow of traffic across the backbone network, which can be useful for purposes such as network optimization and usage allocation.

20 Claims, 10 Drawing Sheets

(51) Int. Cl.
*H04L 43/0882* (2022.01)
*H04L 47/2483* (2022.01)
*H04L 47/762* (2022.01)
*H04L 47/78* (2022.01)
*H04L 47/80* (2022.01)

(52) U.S. Cl.
CPC ........ *H04L 47/2483* (2013.01); *H04L 47/762* (2013.01); *H04L 47/781* (2013.01); *H04L 47/801* (2013.01)

(58) Field of Classification Search
CPC . H04L 43/0876; H04L 47/2483; H04L 47/41; H04L 47/762; H04L 47/781; H04L 47/801; H04L 43/026

See application file for complete search history.

(56) References Cited

U.S. PATENT DOCUMENTS

| | | | |
|---|---|---|---|
| 9,467,362 | B1 | 10/2016 | Segalov |
| 11,489,780 | B1* | 11/2022 | Khosravi .............. H04L 43/062 |
| 2011/0242994 | A1* | 10/2011 | Carvalho .............. H04L 43/026 |
| | | | 370/252 |
| 2013/0067034 | A1* | 3/2013 | Degioanni .............. H04L 43/04 |
| | | | 709/218 |
| 2013/0132603 | A1* | 5/2013 | Cohen ................... H04L 69/164 |
| | | | 709/231 |
| 2015/0078181 | A1 | 3/2015 | Agarwal |
| 2017/0048109 | A1 | 2/2017 | Kant |
| 2021/0336890 | A1* | 10/2021 | Bowie ................ H04L 47/2483 |

OTHER PUBLICATIONS

Final Rejection issued in U.S. Appl. No. 17/106,678, dated Apr. 18, 2022.
Notice of Allowance issued in U.S. Appl. No. 17/106,678, dated Jul. 7, 2022.

* cited by examiner

TRAFFIC ESTIMATIONS FOR BACKBONE NETWORKS

CROSS-REFERENCES TO RELATED APPLICATION

This application is a continuation of allowed U.S. application Ser. No. 17/106,678, filed on Nov. 30, 2020, entitled "TRAFFIC ESTIMATIONS FOR BACKBONE NETWORKS," now U.S. Pat. No. 11,489,780, the disclosure of which is incorporated by reference herein in its entirety for all intents and purposes.

BACKGROUND

Data and content are being used by an ever-increasing variety of applications and services across the globe. In order to connect regional or local networks in different geographic locations, a network such as a backbone network can be used that provides high bandwidth, long run connections. A backbone network may contain various paths through which data can flow, through various network devices. Unfortunately, conventional approaches to managing such backbone networks have been limited by the availability of flow and usage data. An inability to obtain such information can make it difficult to optimize such a network, as well as to determine issues that may impact performance or usage of that network.

BRIEF DESCRIPTION OF THE DRAWINGS

Various embodiments in accordance with the present disclosure will be described with reference to the drawings, in which.

DETAILED DESCRIPTION

Approaches in accordance with various embodiments can be used to determine aspects of traffic and data flow for a network. In particular, various embodiments can determine data flow across a backbone network even though flow data may not be available from one or more types or instances of network devices. Flow data can be observed using types of backbone devices where such observation is enabled, as may include aggregation and transit devices. An algorithm can be applied to determine which data to utilize for flow analysis, where this algorithm can be based at least in part upon rules to prevent duplicate accounting of traffic being observed by multiple devices in the backbone network. These rules can be determined based at least in part upon information such as source address, destination address, and region information, as well as flow pattern data, to determine which flow data to utilize and which to discard. In some embodiments, address mapping may be used to also attribute this traffic to various services or entities. The data can then be analyzed to provide information about the flow of traffic across the backbone network, which can be useful for purposes such as network optimization and usage allocation.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
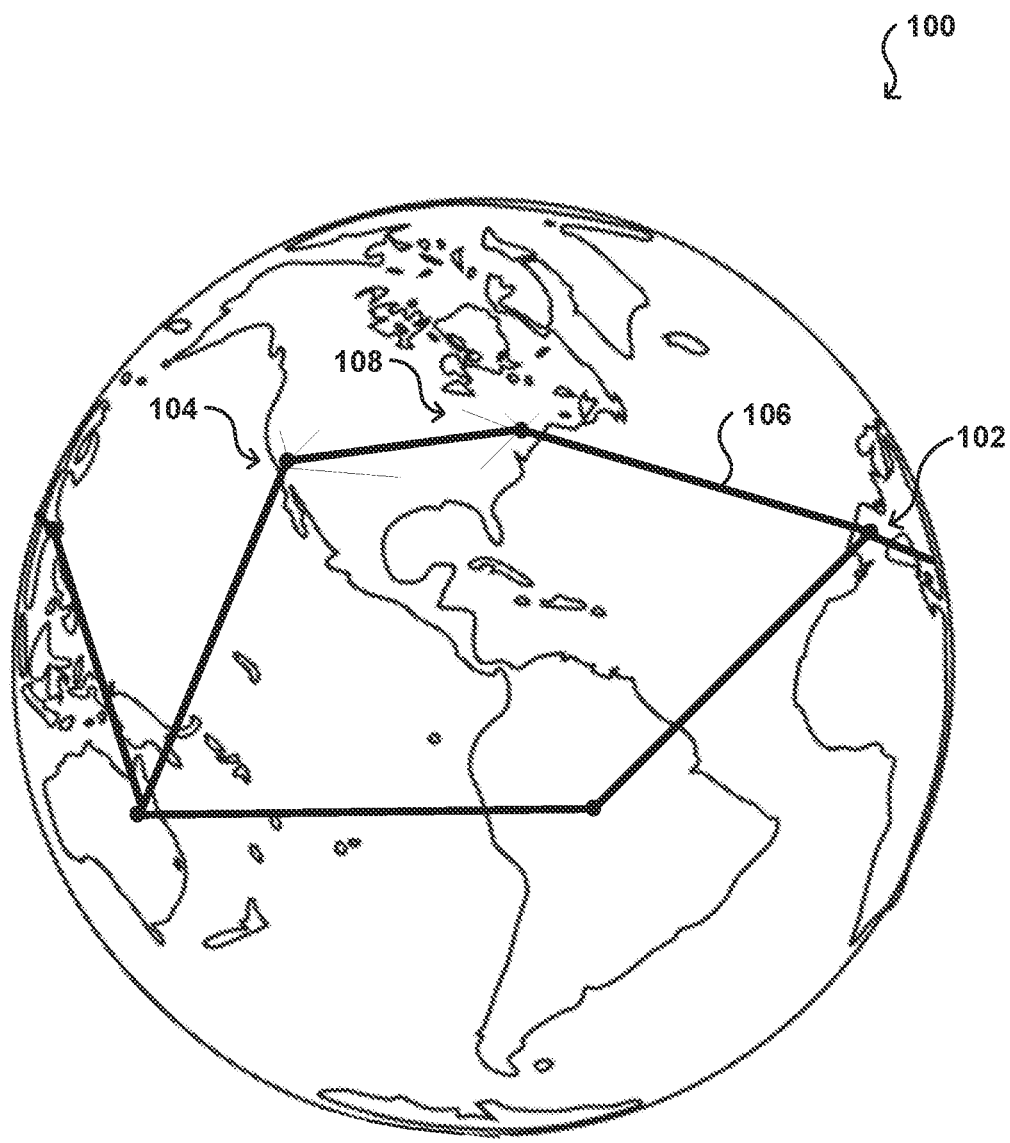
FIG. 1 illustrates an example global backbone network that can be utilized in accordance with various embodiments.

FIG. 1 illustrates connections of an example backbone network 100 for which aspects of various embodiments can be utilized. As illustrated, a global backbone network can include high speed, high bandwidth connections between backbone locations 102, 104 or regions at various locations. These backbone locations can serve as an access point to the backbone network from local traffic, or traffic in a corresponding region. This traffic may originate, or be destined for, a network associated with the backbone network or an external network, such as the Internet, or a network resource on a dedicated connection, such as Amazon Web Services (AWS) Direct Connect. There may be a number of different entities, systems, services, applications, or processes that are responsible for traffic over such a backbone. The traffic from these various entities can vary by time of day or day of week, or seasonally, as well as between different instances of the same time period. In order to perform tasks, such as to configure, optimize, and troubleshoot such a backbone network, it can be at least desirable to understand the traffic that flows across the network. This can include information such as a source or destination for the traffic, services associated with the traffic, paths taken by the traffic, as well as entry and exit points for that traffic, among other such aspects. Unfortunately, such flow information is generally not available for such a network. This can result from, for example, a lack of backbone network devices, or "backbone devices," all supporting a single protocol or approach for providing such information. Certain conventional approaches attempt to analyze traffic leaving a backbone network, for example, and infer or extrapolate traffic information, but such an approach can miss information about a lot of traffic that crosses one or more connections or links of the backbone network. Another approach would be to require all backbone devices to capture flow data, but many of these devices may already have a very heavy load such that it may be undesirable to add any additional functionality to these resources, which may end up slowing down (or otherwise negatively impacting) the network.

Figure 2:
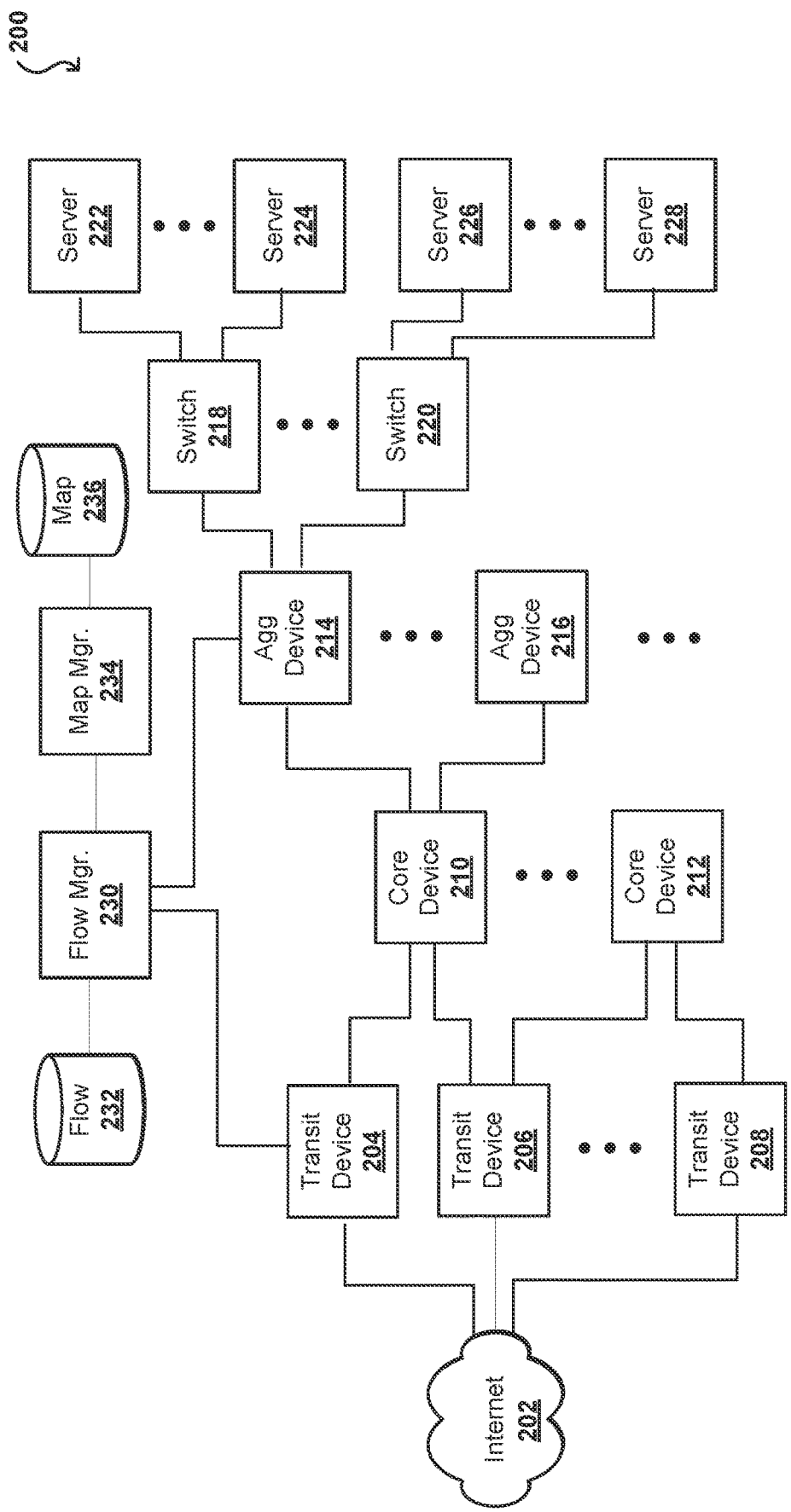
FIG. 2 illustrates components of an example backbone network that can be utilized in accordance with various embodiments.

FIG. 2 illustrates a network configuration 200 including a set of example backbone devices that can be utilized in accordance with various embodiments. In this example, the backbone network can include at least different types of backbone devices. These backbone devices can include a variety of different network connectivity devices, as may include switches, hubs, or routers, that can receive traffic to, direct traffic across or within, and transmit traffic from this backbone network. In at least one embodiment, these backbone devices can be arranged in a hierarchical fashion, although other topologies or configurations can be utilized as well. The backbone devices can connect segments or runs of network cable for transmitting data across the backbone network.

In this example there are three different types of backbone devices considered, although it should be understood that there can be fewer, additional, or alternative types utilized within the scope of the various embodiments. In this example, there can be a number of backbone transit devices 204, 206, 208 utilized to receive inbound traffic from one or more external networks, such as the Internet 202, as well as to transmit outbound traffic to the one or more external networks. In at least one embodiment, border transit devices connect transit centers or edge point of presence (PoP) locations to the Internet, and while internal transit devices can connect other locations, such as CDN classic locations, to the Internet. There can also be one or more backbone aggregation devices 214, 216 that can connect the backbone network to one or more data centers, for example, capable of aggregating traffic for that data center for transmission across the backbone network. There can also be one or more backbone core devices 210, 212 that can transmit data within the backbone network, such as may determine a path to be taken by traffic through the backbone network. Within a data center or computing region, there may be a number of network switches 218, 220 and other networking components for directing traffic from a number of servers 222, 224, 226, 228 (or other computing devices or resources) to, and from, the backbone network.

As mentioned, information about network flow may not be available from all of these backbone devices. For example, NetFlow data (as may be offered through Cisco devices) may be available from various backbone devices, such as various routers, but may not be available from all backbone devices. In at least some embodiments, such flow data may not be available from any, some, or all core devices 210, 212, such as at least border core devices. If flow or traffic data is available from other backbone devices, such as backbone transit and backbone aggregation devices, then a component, system, or service such as a flow manager 230 can collect or obtain flow information from those devices, for storage to a flow repository 232 or other such location. Collecting traffic flow data from these devices will not be sufficient, however, as there will be at least some traffic that will be encountered by one or more of these devices, of the same type or a different type, and thus may be counted more than once. An inability to match traffic for different flow measurements can prevent the flow manager 230 from making an accurate flow estimation for a period of time.

Accordingly, approaches in accordance with various embodiments can utilize an algorithm or approach that prevents traffic from being double-counted, or having data duplicated, without having to analyze the content of the traffic for correlation, which can be expensive and may come with other data-related issues. In at least one embodiment, an algorithm can be based at least in part upon different de-duplicating logic or rules for accounting for different traffic through the backbone network. Such logic can be applied in real time to traffic as it is received to a backbone device, for example, which can determine whether or not to collect information about this traffic. This can include, for example, logic for counting traffic that originates from an external network, that is to be transmitted to an external network, originates from a data center or resource associated with the backbone network, is to be transmitted to such a data center or resource, is primarily transmitted within the backbone network, or is received from and transmitted to an external network, among other such options. In at least one embodiment, an algorithm can consider any or all of these different types of traffic flow, and can ensure that an instance of a given type is counted at most once for traffic flow determination purposes. In at least one embodiment, a flow manager 230 can receive flow data, such as NetFlow data, from aggregation and transit devices, and can process that flow data using such an algorithm to determine flow data to be stored to a flow repository 232 for subsequent analysis or action. In at least one embodiment, this repository may be cache memory that can be accessed by a flow-related application or service. In at least one embodiment, the flow manager can work with a mapping service 234 to obtain map data 236 useful for attributing a service or entity to an instance or flow of traffic based on a mapping between that entity or service and, for example, a range of IP addresses that may be correlated with source or destination addresses of the observed traffic.

Figure 3A:
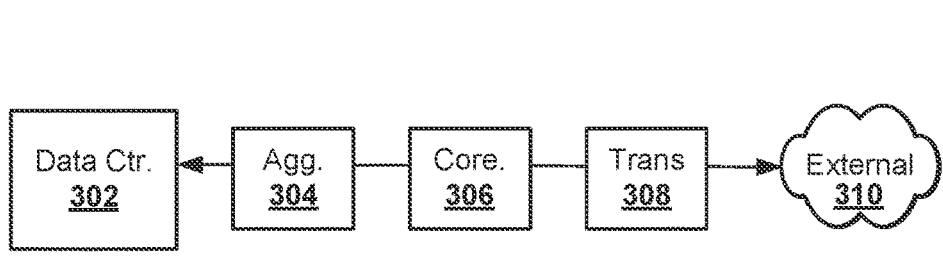
FIGS. 3A, 3B, 3C, 3D, and 3E illustrate example flows of traffic through a backbone network that can be analyzed in accordance with various embodiments.

FIG. 3A illustrates a first example type of traffic flow 300 that can be accounted for in such an algorithm. In this example, traffic may initiate at a data center 302 at a location, such as Virginia. This traffic may be initiated, or associated, with a specific service, such as an EC2, S3, or CDN service for an Amazon backbone network. This traffic can be destinated for an external network 310, such as the Internet, for delivery to a target destination. The traffic can be received from the data center 302 to a border aggregation device 304, and may then pass through one or more core devices 306 before being received to a border transit device 308, which can then transmit the traffic onto the external network 310. In this example, collecting flow data on the aggregation and transit devices would result in the traffic being double-counted. Accordingly, a rule can be utilized to cause that traffic to only be counted once, either by the aggregation device 304 or the transit device 308. This can be managed such that the content of the traffic does not needed to be analyzed in order to perform traffic matching for those devices. In this example, the traffic flow will be captured by the border transit device 308 when the traffic passes through that device to exit the backbone network to the external network. A rule can then be specified that traffic bound for an address in an external network is not to be counted by the aggregation device 304, as it will be counted by the corresponding transit device. In an alternative embodiment, a rule could be utilized wherein traffic initiating from a data center may not be counted by a border transit device.

The same basic rule can be used for traffic in the opposite direction. If traffic is received from an external network 310 to a border transit device 308, and passed through one or more core devices 306 to an aggregation device 304 to pass to a data center, then the flow can be counted by the transit device 308 but not counted by the aggregation device 304 since the origination was an external network. In such an approach, any traffic that has a source or destination address corresponding to an external network can be ignored for flow determination purposes by the aggregation device 304. In some embodiments, the aggregation device 304 may send all flow data to a flow manager, or other such system or service, which can then determine whether or not to count specific instances based on these or other such flow types. It can be beneficial to use the transit device 308 to track traffic inbound from an external network, as the transit device can provide information as to the point at which that traffic entered the backbone network, which may be indeterminable by the aggregation device 304. If region data for that traffic was previously flagged with a network identifier such as "Internet," that region data can be updated to reflect the region in which the transit device 308 received that data from the external network. This region information can also be used to determine whether that traffic will ride the backbone network or stay local, which enables the transit device 308 to determine whether to count that traffic. There may be other connection types or networks, such as for Direct Connect devices, where default region information might be provided, and this information can be updated with the region of the transit device that receives that data.

Figure 3B:
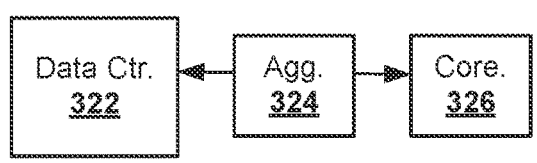

FIG. 3B illustrates a second example type of traffic flow 320 that can be accounted for in such an algorithm. In this example, data is received to an aggregation device 324 from a data center 322, and then potentially passed to one or more core devices 326 before being passed to a recipient within a backbone network environment (e.g., able to receive the traffic from the backbone network using local or internal networking resources without the traffic having to pass through an external network). A similar approach can be used to count traffic from an "internal" network source that is passed through the aggregation device 324 to a data center 322. Using such an approach, traffic flow data can be collected and utilized from aggregation devices for traffic that does not travel to, or from, an external network.

Figure 3C:
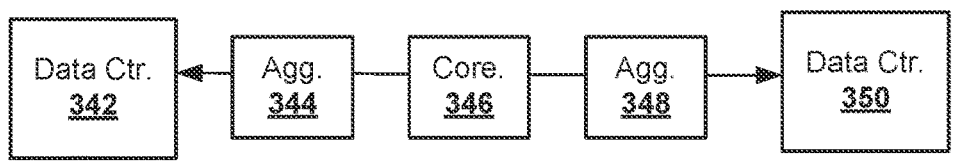

FIG. 3C illustrates a third example type of traffic flow 340 that can be accounted for in such an algorithm. In this example, traffic flow initiates at a first data center 342 and is received by a first aggregation device 344. This traffic may pass through one or more core devices 346, before passing to a second aggregation device 348 and on to a second data center 350. To avoid double-counting resulting from flows detected by both aggregation devices 344, 348, a rule or logic can be specified whereby traffic is only counted by an aggregation device in a same region as a source (or destination) of the traffic. If only utilizing the source region, then only the first aggregation device 342 would count the flow and not the second aggregation device 348 in a different region.

Figure 3D:
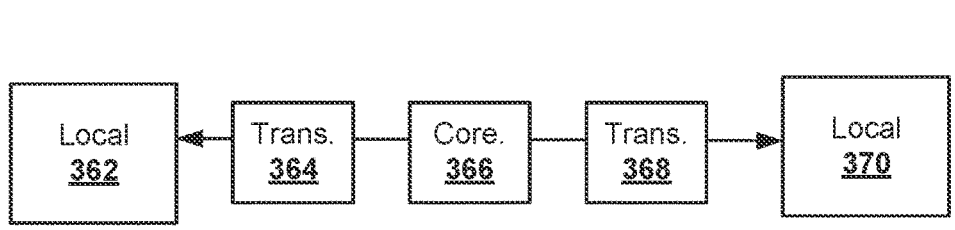

FIG. 3D illustrates another example type of traffic flow 360 that can be accounted for in such an algorithm. In this example, traffic initiates from a local (or associated) network location, such as a point-of-presence location for a content-delivery network (CDN) connected to a backbone network. The traffic can be received to a transit device 364, which here would not be a border transit device but an internal transit device. The traffic may pass between one or more core devices 366 before being received to another transit device 368 and transmitted to a local network location. In this example, traffic can be counted only by a transit device that is in the same region as a source (or destination) region of the traffic, in order to ensure that the traffic is only counted once. If local traffic instead went to, or came from, an external network, that traffic would be counted by the respective transit device.

Figure 3E:
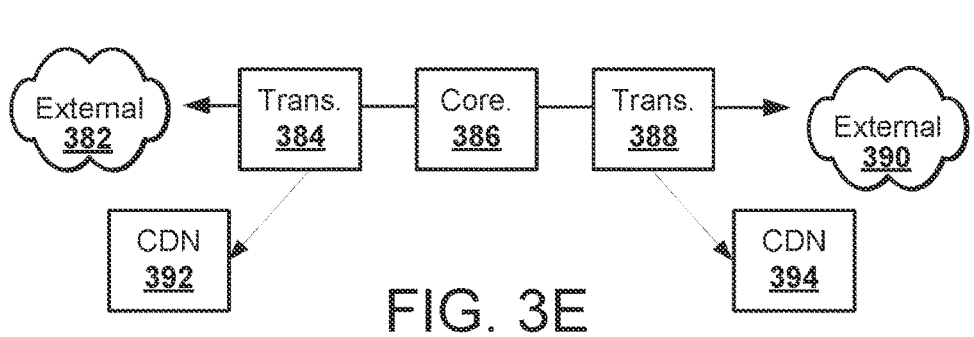

FIG. 3E illustrates another example type of traffic flow 380 that can be accounted for in such an algorithm. In this example, traffic initiates from an external network 382 and is destined for an external network 390, which may be the same or a different network. This traffic can pass through multiple transit devices 384, 388 and/or core devices 386, but in this case may not be counted as it may not be attributable to any specific service. In at least some embodiments, such traffic may account for a very small percentage of traffic, such that it may not be worth the effort to track. In other embodiments, an approach could be taken wherein a transit device in the same region as the source or destination counts the traffic. In a similar situation, traffic could have a source and destination in a content delivery network (CDN) 392, 394, and could be ignored for service attribution purposes. If this traffic is to be counted, then it could be counted by a transit device in the same region as the source or destination.

Such an approach can help to account for backbone traffic of interest, while making sure that this traffic does not get accounted for more than once. As mentioned, however, in at least some situations it may be desirable to identify a service or entity associated with that traffic. Such information can be useful to determine usage of different portions of the network by different services, for example, which can help with tasks such as flow optimization and cost allocation. In at least one embodiment, a set of mappings can be obtained and/or maintained that maps specific network addresses (e.g., IP addresses) with specific services that utilize those addresses. In this way, any traffic that is counted by a backbone device that has an address associated with a service can have that traffic attributed to that service. In at least one embodiment, this mapping data can be available to a flow manager that can, for any measured flow, check the mappings to determine whether a flow can be attributed to a specific service (or entity, system, application, etc.). This information can then be stored with the flow data, as may function as enhancement data for NetFlow or other such flow data. This information can then be analyzed to determine flow-related information for various services. In at least some embodiments, this enhancement information can also specify CDN data that can be used to determine CDN-attributable usage. In at least some embodiments, if a source or destination IP address is not within a range mapped by this data, then that address can be treated as if it belongs to an external network and can be treated using logic outlined herein.

In some situations, it may also be desirable to determine paths taken by specific traffic. As discussed with respect to FIG. 1, there may be various paths between two regions that traffic may take. At the global level, this may include a number of path segments or "hops" across the globe, such that depending on the path the traffic may spend a much longer period of time being transmitted across the backbone network. Being able to identify the paths being taken can help to optimize the backbone such that fewer hops are needed on average, which can reduce the length of time that traffic is in the backbone network on average, and thus reduce the cost of operation and bandwidth needed for the backbone network. In at least one embodiment, another data set can be accessed to provide this path information. This data can be provided by a switch pathing service in at least one embodiment, which can provide a breakdown of the traffic per path segment. If, for example, traffic originates in north America and is destined for Australia, that traffic might go direct to Australia, or could take a path through Europe and Asia. As mentioned, it can be desirable to determine the paths that different traffic takes in order to understand flow through the network, as well as to optimize traffic flow within the network. Such an approach can enable the flow manager to proportionally assign bandwidth usage to various services based, at least in part, upon determined paths of traffic flow.

Figure 4:
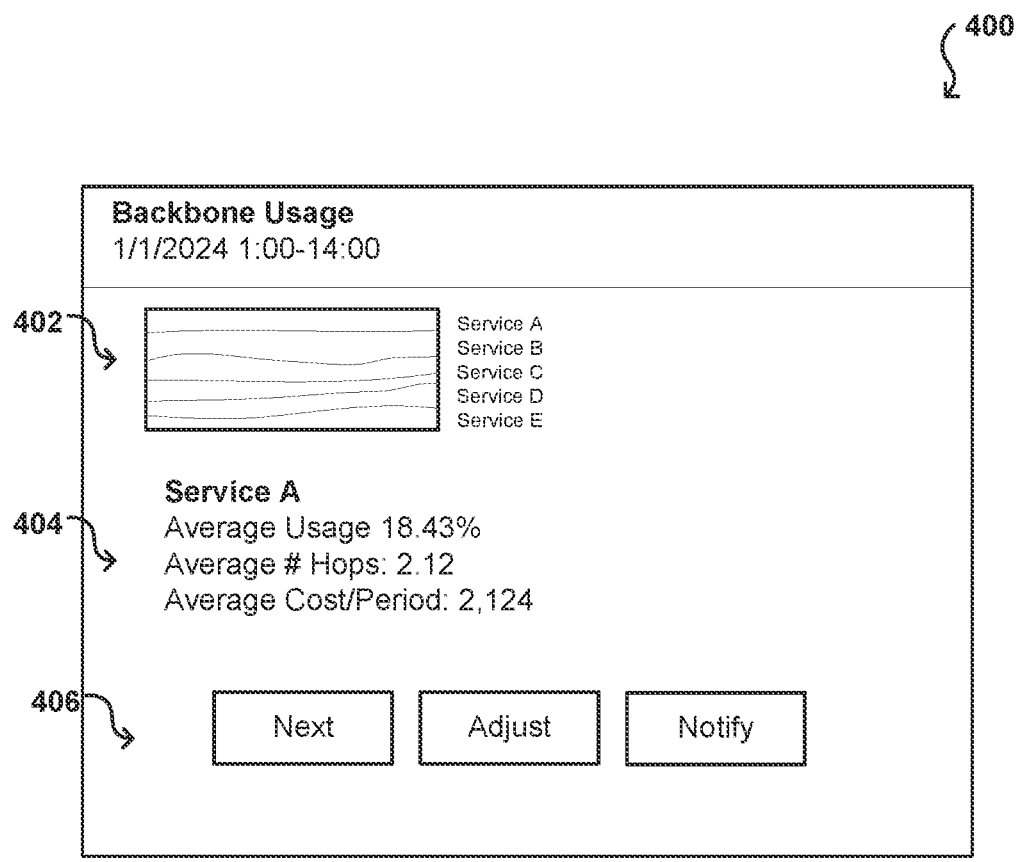
FIG. 4 illustrates an example interface that can be generated in accordance with various embodiments.

As mentioned, this data can be collected, aggregated, and analyzed using a system or service such as a flow manager. The data can be aggregated and/or analyzed continually, periodically, or upon request, among other such options. In at least some embodiments, the data will be pulled daily from a central flow database, regional data buckets, or other such locations, and the data will be analyzed to be presented through a management console, set of reports, or other such option. FIG. 4 illustrates an example management interface 400 that can be provided in accordance with various embodiments. In this interface, a graphical representation 402 can be provided that shows usage of a backbone network by different services over a recent period of time, such as over a last week or month. In situations where statistics are generated with higher granularity, such as for every five minute period, the period of time might be a last hour, day, or other such period. The interface can also enable a user to drill down on specific aspects of backbone network usage, such as usage per service, usage per region, usage per path segment, and so on. In this example, a user can view data and statistics 404 for individual services. The user can also be presented with options 406 to cycle through these services (or move to data for the next service), as well as to adjust one or more aspects of how those services are handled by the network. The user may also have an option to notify or contact a representative for a given service based at least in part upon the presented information, such as to notify if there is a large spike or drop in traffic, if the usage is outside an agreed-upon usage range or type, or if there is a change in the way the traffic is being routed through the backbone network, among other such options. In some embodiments, a service provider may also be able to access such a console for data relevant to their service, which may also allow that provider to adjust aspects of backbone usage for their service. Reports can also be generated at appropriate times, such as monthly for finance reports, which can show information such as usage and cost allocation for various services, and for network management may include information such as average path length, average number of hops, average time in backbone network, most used path segments, and other such information that can be useful in determining the health of the backbone network, as well as optimizing that network. Such flow information can also help to allocate costs, as backbone usage for a first service might be higher than a second service, but if they are providing the same volume of traffic between similar regions but the higher usage is due to path selection or routing by the backbone devices, then the services may be charged for similar usage instead of the first service being charged more for a higher overall usage of network bandwidth.

Figure 5A:
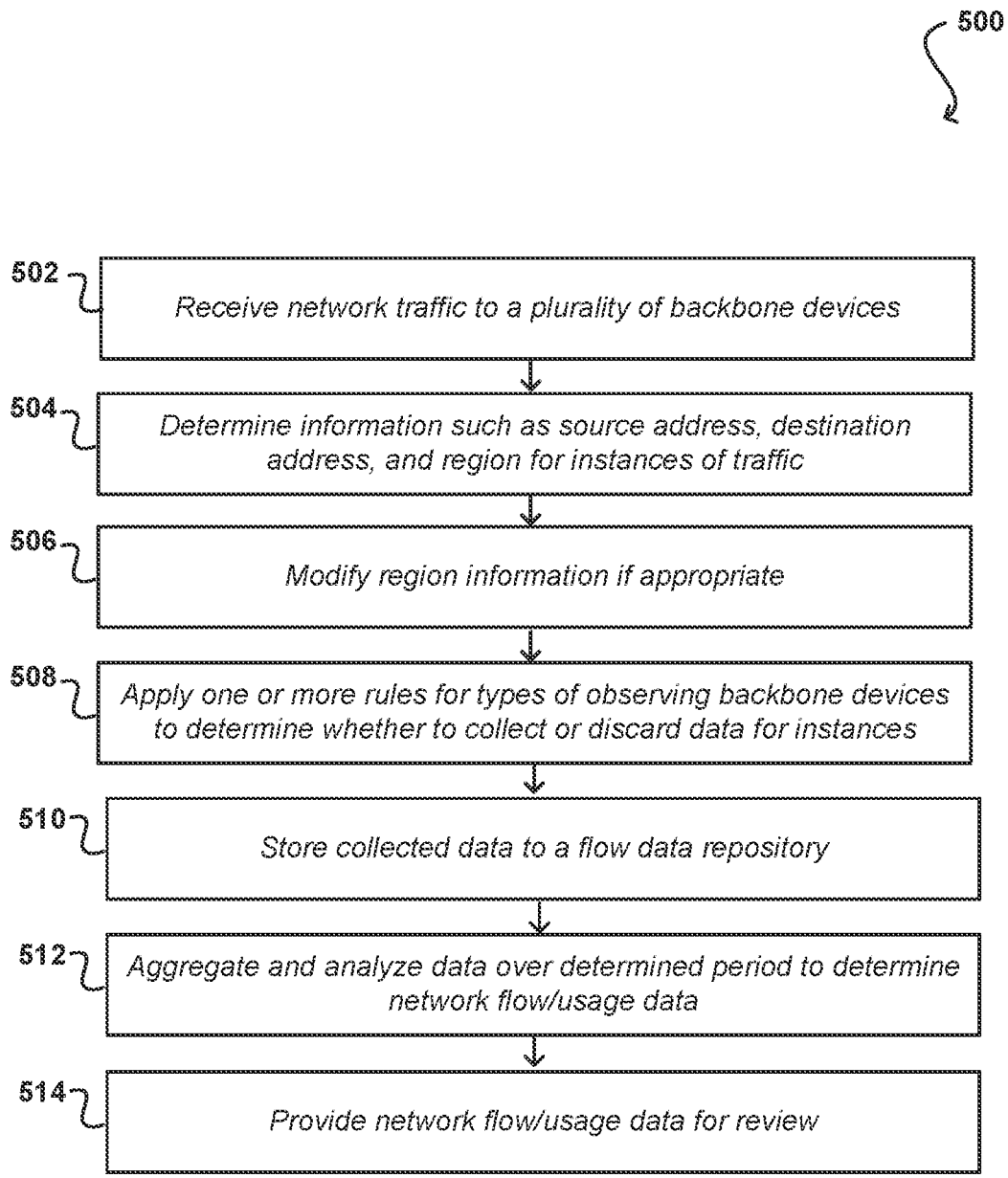
FIGS. 5A, 5B, and 5C illustrate processes for determining flow data for a backbone network that can be utilized in accordance with various embodiments.

FIG. 5A illustrates an example process 500 for determining traffic flow for a backbone network that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, although discussed primarily with respect to backbone networks, it should be understood that there may be other types of networks that can benefit from aspects of the various embodiments as discussed and suggested herein. In this example, traffic is received 502 to a plurality of backbone network devices. These may include network devices such as switches or routers that are configured to perform tasks such as transit for an external network or aggregation for a data center, among other options discussed and suggested herein. For each instance of traffic, such as may correspond to data being transmitted from a source address to a target address, the device can determine 504 information such as source address, destination address, and region information for the traffic. In one example, addresses can be determined from the packet headers while the region information can be determined using the backbone device that detected the traffic entering the backbone network. In at least some embodiments, the device can modify 506 information associated with that traffic, such as to update region data to correspond to a region of the backbone device. That backbone device can then apply 508 one or more rules (such as those described above for FIGS. 3A-3E) for that type of backbone device to determine whether to collect or save this traffic or flow data for that instance of traffic, based at least in part upon the data determined for this traffic instance. Flow data to be collected can then be stored 510 to one or more flow data repositories. This data can then be aggregated 512 and analyzed to determine flow data for the backbone network over a period of time. Information, such as statistics and usage data, can be provided 514 for review, such as through a console, interface, or set of reports. Other actions can be taken as well, such as to generate a notification, log an event, or trigger an alarm if a change in backbone usage is determined that satisfies a corresponding action criterion (e.g., an undesirable change in usage or behavior of the network).

Figure 5B:
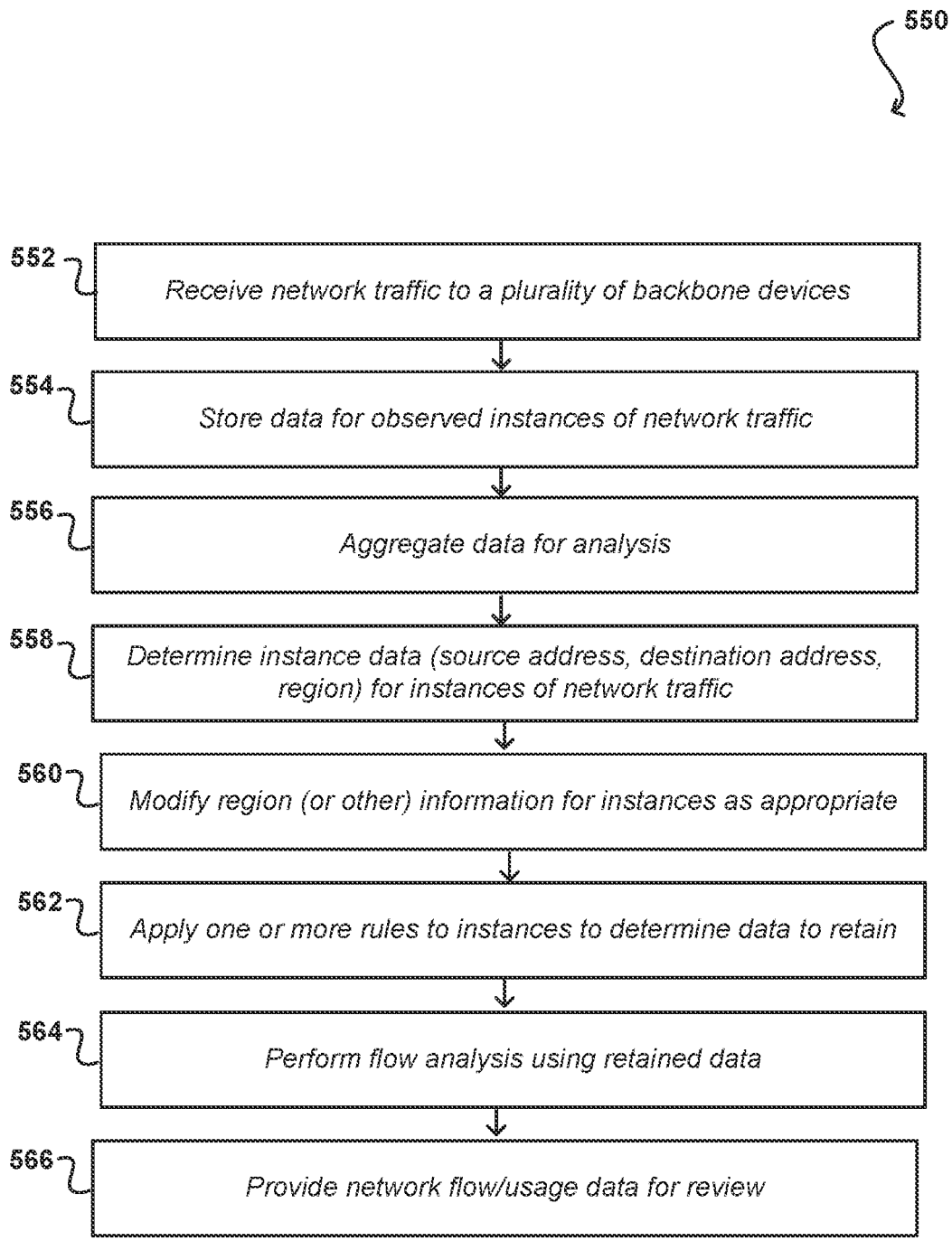

FIG. 5B illustrates another example process 550 for determining traffic flow for a backbone network that can be utilized in accordance with various embodiments. In this example, traffic is received 552 to a plurality of backbone network devices. Data determined for this traffic, such as source and destination address, can be stored 554 to one or more flow data repositories. This data can then be aggregated 556 for analysis to determine flow data for the backbone network over a period of time. For each instance of traffic, such as may correspond to data being transmitted from a source address to a target address, information can be determined 558 as may related to source address, destination address, and region information for the traffic. In at least some embodiments, information associated with traffic instances can be modified 560, such as to update region data to correspond to a region of the backbone device. One or more rules (such as those described above for FIGS. 3A-3E) can be applied 562 to each traffic instance to determine whether to retain this traffic or flow data for analysis. This can be based upon, for example, a unique flow identifier or the type of backbone device that provided flow data for that instance, among other such options. Flow analysis can then be performed 564 using the retained flow data, such as to generate statistics on average number of hops, average length of time in the backbone network, usage by different services, among other such options discussed and suggested herein. Information, such as at least some of these statistics and usage data, can then be provided 566 for review, such as through a console, interface, or set of reports. Other actions can be taken as well, such as those discussed with respect to FIG. 5A.

Figure 5C:
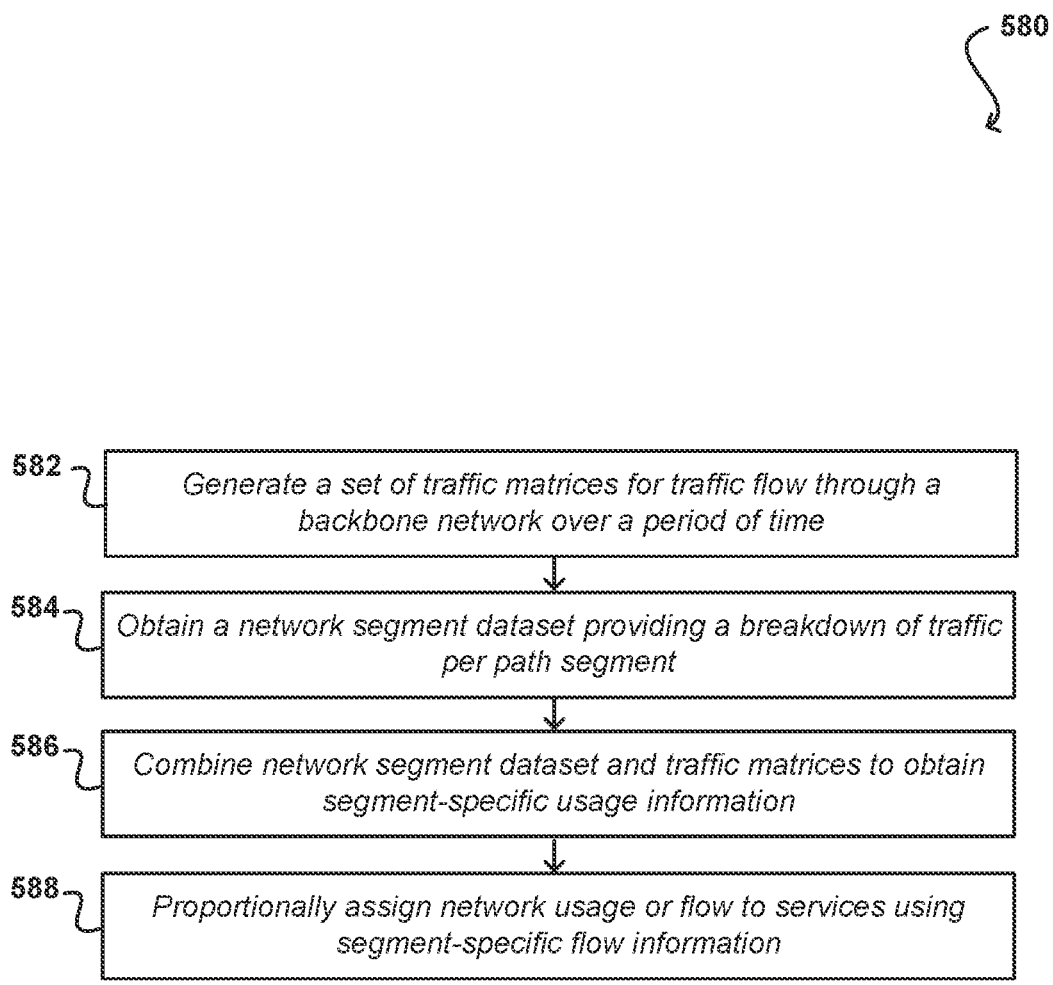

FIG. 5C illustrates an example process 580 for determining a number of path segments, or hops, taken by traffic through a backbone network. This can help to more accurately apportion usage of the backbone network. In this example, flow data such as a set of traffic matrices can be generated 582 for traffic flow through a backbone network, such as described with respect to FIGS. 5A and 5B. An additional network segment dataset can be obtained 584 that provides a breakdown of traffic per path segment, such as may be provided by a switch pathing service. The data from the traffic matrices and the network segment dataset can be combined 586 to provide flow data that includes segment-specific usage information. This data can then be used to proportionally assign 588 network flow or usage to different services or entities further upon the total or average number of segments, or hops, taken by traffic for those services or entities through the backbone network.

In one implementation of such a process, the datasets for the backbone device types can be unioned into a single dataset. Rules or logic can be then applied to the collected flow data. Any flow data where both the source and destination correspond to an external network, such as the Internet, can be filtered out since such flow may be unable to be assigned to a service. Flows that are to, or from, such an external network that are observed on aggregation devices can be filtered out as well, as data for those flows can be captured in more detail on transit devices that can provide region information. Flow data observed on an aggregation router can be retained only where the device region equals the source region, to avoid traffic being double counted in both the source and aggregation regions. If the source region is a default region name, such as "Internet," then the source region can be redefined to use the region of the observing backbone device. Other region updates can be made, such as to define as an external network as the destination region where the destination may be undeterminable or unable to be attributed to a mapped service. Any traffic flow that is detected by a transit device other than a border transit device can be filtered to only include specific types of traffic as specified by the rule, such as for specific types of traffic between specific ranges of source and destination addresses, as may correspond to CDN data for an Amazon backbone network. To avoid double-counting, this traffic may be filtered out where the source region is different from the region of the device observing the data.

Such approaches can provide visibility into traffic going over a network such as a backbone network, which otherwise could have a blind spot when evaluating backbone development decisions. This visibility enables the correct service owners to be held accountable and tied into backbone expense and scaling. Such a process can also provide a cost assignment process which uses actual backbone traffic data, instead of data such as IP egress percentages used as a proxy for backbone traffic. This visibility can help a user to understand the traffic contributors of the backbone network on a per region and service basis. Such approaches can also overcome the unavailability of flow data on certain backbone devices, such as backbone core devices, that might otherwise obstruct creation of traffic matrices on a region-to-region and service level, in order to know specifically what backbone path is being taken in full detail for each traffic flow. Network traffic measurement and estimation of traffic matrices for a backbone network can provide critical data for tasks such as capacity planning, traffic engineering, efficiently designing backbone label edge routers and costing the network. Traffic matrices (TM) reflect the aggregate traffic volume traversing between all the possible source and destination pairs in the network. Obtaining an accurate traffic matrix is an otherwise challenging problem, due to the large number of source and destination pairs, high volume of traffic on each interface and router, the lack of accurate measurement and coverage of flow technologies, such as NetFlow. Since NetFlow may be implemented on devices such as aggregation and transit devices, at least some of which act as edge devices for the border network and capture all the traffic entering and exiting the backbone network, the NetFlow data collected on them can be leveraged to create the traffic matrices for the backbone network.

If NetFlow is used to collect flow data, for each interface on an observing device, the flows are identified by fields including source IP, source port, protocol, destination port, and destination IP. The device inserts a new record into the flow cache if the flow does not exist; otherwise, if the entry is already there, it updates the existing record. The device then uses several rules to decide when a flow is ended and exports the flow cache entries. Besides the main identifiers for each flow, there are other fields also being captured for each record such as number of packets, total byte counts, and timestamp the flow packets were captured. The raw NetFlow data can be used to create backbone traffic matrices. The traffic matrix created based on the flow data collected from the above mentioned device families provides the total traffic between any possible region pairs in the network. For instance, how much traffic has been sourced in one region and is destined to another region, as well as the contribution of different services (e.g., compute, storage, or CDN) for this logical traffic flow. The logical view of the traffic flows in the network does not provide any information on how traffic from source gets to destination. They may be directly connected by a circuit, or may have multiple hops between with multiple potential routing paths, and different cost implications. The network devices that see the hops for cross-region traffic do not have any flow technology enabled. Given this limitation, alternative data sources are used to infer which physical paths logical data flows consume proportionately, in order to accurately assign costs to logical flows.

In at least one embodiment, to create traffic matrices for a backbone network and derive cost contribution imposed by each region and service on the physical circuits, flow data (e.g., NetFlow data) can be read from one or more historical storage buckets. For every device and for a period (e.g., one hour) of data, there may be hundreds of files, each containing thousands of entries. For each traffic flow, NetFlow can record a wide variety of fields such as source and destination IP address, source and destination port, protocol, source and destination interface, bytes, and number of packets, etc.

In the process of reading the NetFlow data, a five-tuple (source IP address, source port, protocol, destination port, destination IP address) can be used to identify the unique traffic flows. The timestamp when the flow was observed can also be retained, as well as the number of bytes and packets associated with that flow. The number of packets for each flow can be multiplied by a constant (of 58 bytes) and added to the total number of bytes. This constant can account for the additional overhead being added by the link layer (18 bytes) on top of the IP packets, which is usually not considered as part of the MTU (Maximum Transfer Unit) size, as well as 40 bytes being added as encryption for all the backbone spans leaving backbone provider control. While this processed NetFlow data can serve as the basis for analysis, this data by itself may be insufficient since the IP addresses do not convey any meaningful and actionable information. These IP addresses can be attributed to known locations, services, applications, and/or customers in order to have useful and actionable data.

To annotate the IP addresses observed for each flow record in NetFlow to something meaningful and qualitative, an additional data source or service can be utilized that is aware of the IP address ranges for relevant services or applications, etc. One such service is an IP prefix vending service for internal IP space and is designed to automate the registration and/or deployment of new regions in a programmatic way. At least one embodiment can start by leveraging an IP taxonomy file generated based on combining several data sources, to improve the coverage and quality of the taxonomy file by identifying missing regions and services.

For example, IP prefixes do not have a 1:1 relationship with the IP addresses/prefixes observed in NetFlow records. Accordingly, the flow records can be mapped using a longest prefix match algorithm, since each entry may specify a sub-network, and one IP address/prefix in NetFlow may match more than one entry. The longest prefix match chooses the entry with the most specific of the matching entries, such as the one with the longest subnet mask, or the entry where the largest number of leading address bits of the observed flow match those in the table entry. In the process of longest prefix match, the IP addresses observed in NetFlow can be used instead of IP prefixes, since the IP prefixes in NetFlow records are attached after observing the packets based on a longest prefix match performed by the device, which can be different from the actual table used for routing. Moreover, using IP addresses can provide for better accuracy. Relying on IP prefixes in the NetFlow record can otherwise lead to inaccurate mapping of traffic and even dropping the traffic flow.

In some networks, there may be special prefixes that need to be treated individually. This can include an address range used for connectivity between services or locations that may otherwise lead to incorrect location mapping. An approach in accordance with at least one embodiment can block such a range before proceeding with the annotation. It should be noted that these prefixes may not amount to a material amount of traffic in certain systems, such as less than 0.05% of the total traffic on a device.

As mentioned, after performing traffic annotation against a source or service, traffic can be removed that has source/destination marked as Internet and the other end is the same region the device is located. It can be assumed that this traffic will not go over the backbone, and if it does ride the backbone then it will be captured on a border transit device in a different region where it enters or exits the network. Tromboning, or intra-region, traffic can also be removed, which bounces back to the same region and has the same region as source and destination.

In at least one embodiment, LER (Longest Exit Routing) can occur when using the backbone network to hand off customer traffic as opposed to using third party networks. Reading NetFlow data, LER traffic would be observed on a border aggregation device of the source region, if sourced from a data center, and a border transit device of the transit center or PoP location where it leaves the network. In the annotation process, on the border aggregation device the traffic flow's destination region could be marked as Internet, since the destination IP address is external and may not be covered in such services. The traffic flow might even be filtered out if the source region is the region in which that border aggregation device is located. However, on the border transit device, since the source region would be different than the region/location of the device itself, the traffic flow would be included in the backbone traffic matrices. The destination region, which has been marked Internet, can be rewritten as the region/PoP in which the border transit device is located. The destination service could still remain as the Internet. Such an approach can provide visibility into the involved locations and their contributions for LER and ingress traffic consuming the backbone network. Moreover, for simplicity, traffic to/from the Internet observed on border aggregation devices can be ignored, as this type of traffic would be observed on border transit devices.

In at least one embodiment, the time granularity of the traffic matrices can be selected in a way that that time-interval is a real representation of the duration of the traffic flows in the network. In order to create the traffic matrices, the NetFlow collected on the edge devices of the border network can be read and the raw NetFlow data aggregated on a (source IP address, source port, protocol, destination port, destination IP address) basis, for example, keeping the bytes, packets, and timestamp for each unique traffic flow entry. Since the time resolution of each NetFlow entry is in milliseconds, the collected NetFlow data can be further aggregated on a timestamp basis. The time interval to aggregate the NetFlow data can be chosen in such a way that is a representation for the duration of the traffic flows. In one experiment, results showed that 97% of the flows have a duration less than 1-minute and 99.85% fall within 5-minute time interval. In order to make sure the chosen time interval covers the entire traffic flows, the NetFlow data can be aggregated on a 5-minute time window basis, with the traffic matrices being created with the same granularity.

As mentioned, network traffic collection and creation of the traffic matrices face a challenging problem of traffic flow deduplication. Since flow data observation can be enabled and being collected on different devices in the network, it is possible that the same flow is going to be captured on more than one device. Moreover, as collected data (e.g., NetFlow) is sampled, there is the possibility of under-reporting a flow record or even missing out an entire flow. One way to reduce the sampling error is to read NetFlow collected on all the devices and on both directions of the device (inbound and outbound). This reduces the probability of missing out small flows. However, this contributes to the possibility of capturing a flow on multiple locations. If ignoring the sampling error and only reading flow data from the edge devices and in one direction out of those devices, inbound or outbound only, deduplication can be substantially avoided.

To create the traffic matrices in such a way to overcome the deduplication, flow data can be read for inbound traffic on the south facing interfaces of border aggregation and internal transit devices to capture traffic leaving the data centers and, for example, CDN PoP locations, and on the north facing interfaces of border transit and internal transit devices to capture external traffic entering the network. However, there is a downside with this approach in at least one embodiment, which is not capturing content delivery network (CDN) metro traffic since CDN metros do not have any NetFlow enabled, and also losing the visibility of the LER traffic. Reading NetFlow for outbound traffic on the north side of the border transit devices provides visibility into the traffic originated from an internal location and destined to the Internet, LER traffic. It also provides visibility into the CDN metros traffic leaving the network. Moreover, to capture CDN metros traffic destined to data centers, flow data can be read for outbound traffic on the south facing side of border aggregation devices. Therefore, to have visibility into LER and CDN metros traffic, flow data can be red on both directions (inbound and outbound) on the north facing and south facing side of border transit and border aggregation/internal transit devices, respectively, leading to the use of a deduplication process as discussed herein.

In order to create the global traffic matrices on a 5-minute time-interval basis in at least one embodiment, the deduplication algorithm can be performed for all service regions and edge PoP locations with the same time granularity. A deduplication algorithm aggregates flow data based on the unique identifiers of traffic flows on the south facing interfaces of border aggregation devices and internal transit devices, and also on the north facing side of border transit devices. On border aggregation devices, it can drop all the entries with one end marked as Internet or off-net PoP location. The algorithm can then append all the traffic flows from the previous steps, drop all the entries with the same flow key value, and only keep the one with the maximum traffic value. Choosing the maximum value instead of the minimum or the average of a unique traffic flow for a specific point in time might lead to overestimating small flows. However, it reduces the probability of underestimating large flows and also helps to be more conservative in making scaling decisions. The algorithm then appends the traffic matrices created for all the regions/edge PoP locations, and performs another deduplication to exclude any duplicate traffic from the global traffic matrices.

The traffic matrix created using flow data off of the border edge devices can provide a logical view of the traffic flows riding the backbone network. The matrix can contain the ultimate source s and destination d, regardless of how traffic gets from s to d. Source s and destination d might be connected by a direct circuit, or may have multiple hops between, with multiple potential routing paths and cost implications. The network devices that see the hops of the backbone traffic may not have any flow technology enabled. Given this limitation, an alternate data source, such as LSP (Label Switch Pathing), can be used to infer the physical paths the logical traffic flows consume proportionally, as discussed above, such that cost can be assigned to flows based on the paths they are taking. In at least one embodiment, using LSP stats and joining them with traffic data to map IP addresses to device names, a full view of the total traffic between regions can be created, including the paths the traffic takes.

In at least one embodiment, an approach can let S be the set of sources in the network with size $|S|=N$, D be the set of destinations in the network with size $|D|=M$, K be the set of services in the network, and (u, v) represent a directed link in the network from node u to node v. The traffic matrices TM created for the backbone using NetFlow data can be defined as a matrix of elements of $F_{N,M}$, where each element of TM represents the total traffic between any given source and destination pair, s, d, in the network. This can be further expanded as follows:

$$F_{s,d} = \sum_{k \in K} f_{s,d}^k$$

where $f_{s,d}^k$ represents the traffic between source s and destination d carrying traffic belonging to service k.

From LSP stats, the set of paths taken for traffic between source s and destination d can be given as $P_{s,d}$. Each path can consist of single or multiple directly-connected links carrying traffic going from s to d. The total traffic from s to d on link (u, v) can be given by $p_{s,d}^{(u,v)}$. Given this, the total traffic associated with traffic flows driven from NetFlow to individual links in the network can be proportionally derived. The total traffic on link (u, v) for traffic flow between s and d, carrying service k, can be given by:

$$\text{traffic}(f_{s,d}^k, (u, v)) = \frac{f_{s,d}^k}{F_{s,d}} * p_{s,d}^{(u,v)}$$

In order to derive the cost burden by region and service on a given backbone link, the traffic contributors for that link in the network can be identified. Using available data to obtain the cost per each circuit, cost can be assigned for each region and service. If $c_{(u,v)}$ denotes the cost of link (u, v), then the cost associated for traffic flow from s to d for service k can be denoted as follows:

$$\text{cost}(f_{s,d}^k, (u, v)) = c_{u,v} * \text{traffic}(f_{s,d}^k, (u, v))$$

In at least one embodiment, LSP data can be collected off border core devices and can contain the LSPs programmed in the network, how much traffic they carry, and what path they take. Using LSP data, the set of paths taken for traffic between source s and destination d can be given as $P_{s,d}$. Each path, $p_{s,d}$, within $P_{s,d}$ consists of single or multiple hops across the backbone. A hop can be defined as one portion of the path between a source and destination pair (SDP), which is crossing two different regions/metros. Further, knowing the number of hops for all the possible paths between source s and destination d, the average number of hops between s and d can be calculated. With this, the average number of hops traversed over the backbone can be calculated for incoming service traffic from all the regions to a given CDN metro. A ceiling can be set as the average number of hops to be more conservative. The average number of hops for all the incoming service to CDN traffic for destination d can be given as:

$$\left\lceil \sum_{s \in S} \frac{\sum_{p \in P} |p_{s,d}|}{M} \middle/ N \right\rceil, \text{ subject to traffic}(s, d) >= 1 \text{ Gbps},$$

where S is the set of sources sending service traffic to CDN metro d in the network with size=N, P is the set of paths between source s and destination d in the network with size $|P|=M$, $|p_{s,d}|$ is the size (number of hops) of the path p between source s and destination d, and traffic(s, d) is traffic between source s and destination d. This example focuses on traffic higher than 1 Gbps to exclude monitoring traffic, so as to not mask improvements made due to traffic coming from farther locations or artificially lower the average due to traffic coming from locations a few (e.g., 1-2) hops away.

Figure 6:
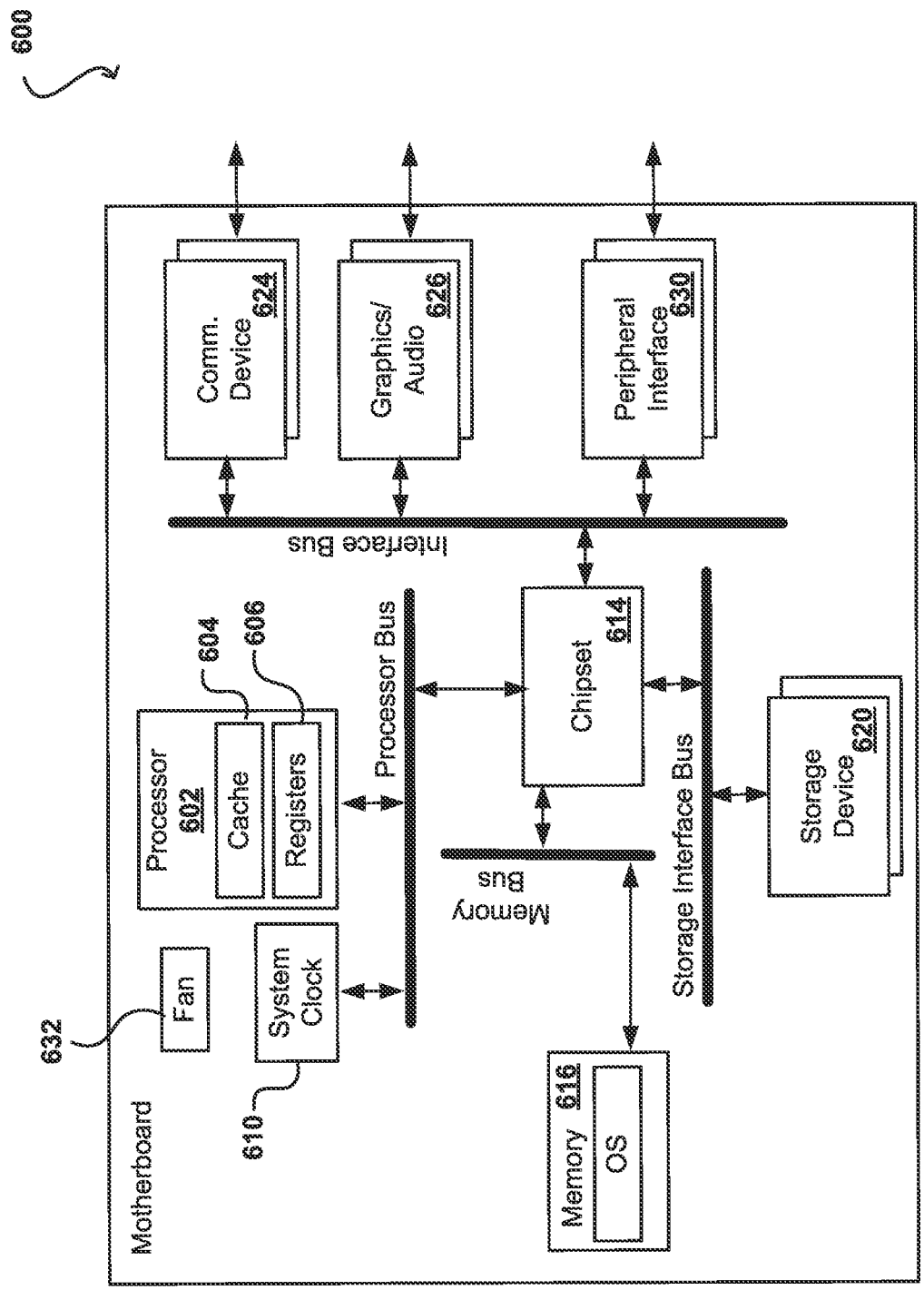
FIG. 6 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 6 illustrates components of an example computing device 600 that can be utilized in accordance with various embodiments. As known for computing devices, the computer will have one or more processors 602, such as central processing units (CPUs), graphics processing units (GPUs), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 630, a communication device 624, a graphics or audio card 626, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 7:
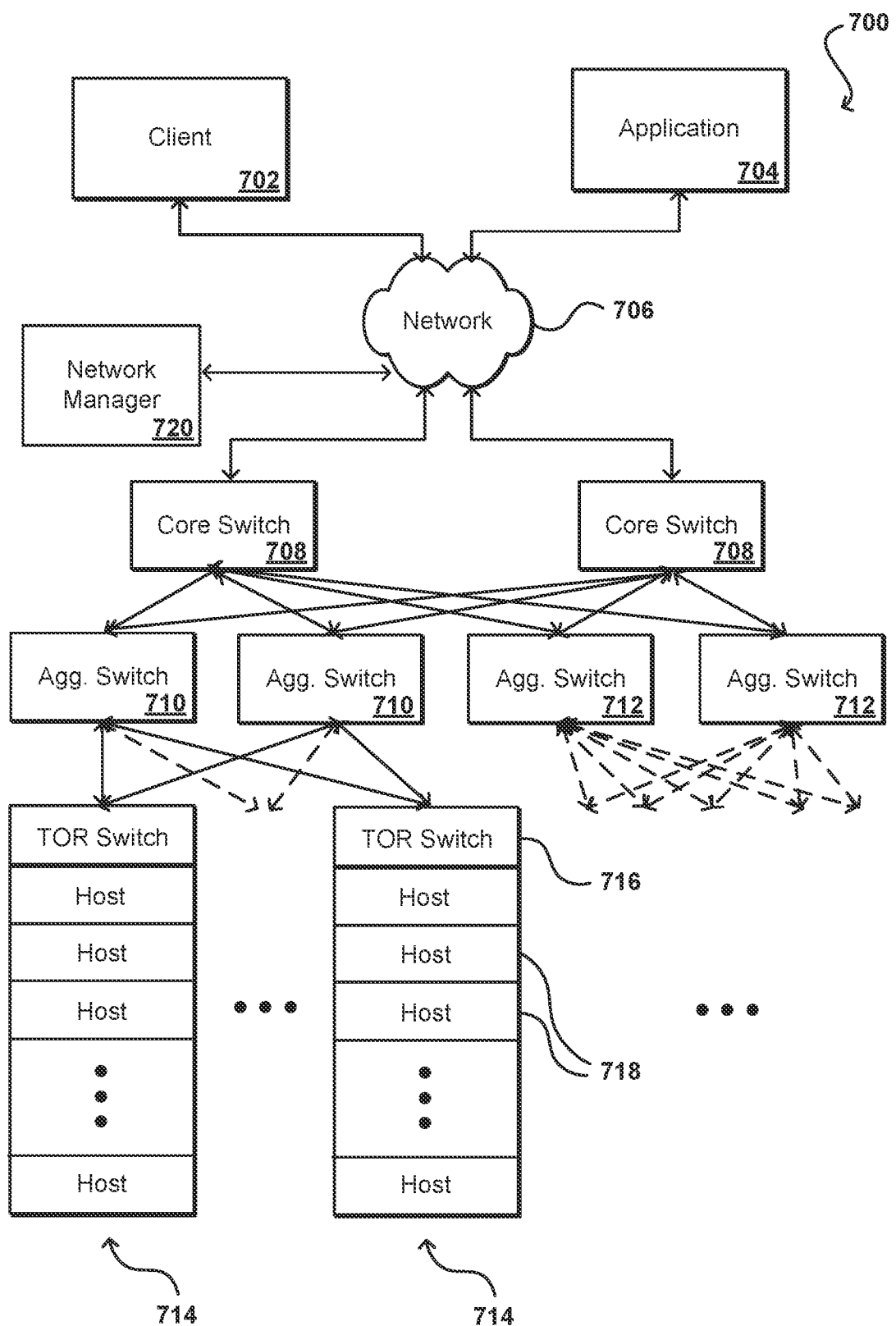
FIG. 7 illustrates components of an example data center environment in which aspects of various embodiments can be implemented.

As mentioned, SoC devices may be utilized in a shared resource environment, such as a data center or server farm. FIG. 7 illustrates an example network configuration 700 that can be used to route communications between specific host machines or other such devices in such an environment. This example shows a typical design that can be used for a data center, wherein a source such as a client device 702 or application 704 is able to send requests across at least one network 706, such as the Internet or a cellular network, to be received by one or more components of the data center. Properties of various components of the network, such as provisioned instances, etc., can be managed using at least one management system, component, or service 720. In this example, the requests are received over the network to one of a plurality of core switches 708, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 708 is able to communicate with each of a plurality of aggregation switches 710, 712, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 710, 712 is linked to a plurality of physical racks 714, each of which typically contains a top of rack (TOR) or "access" switch 716 and a plurality of physical host machines 718, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 706. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 8:
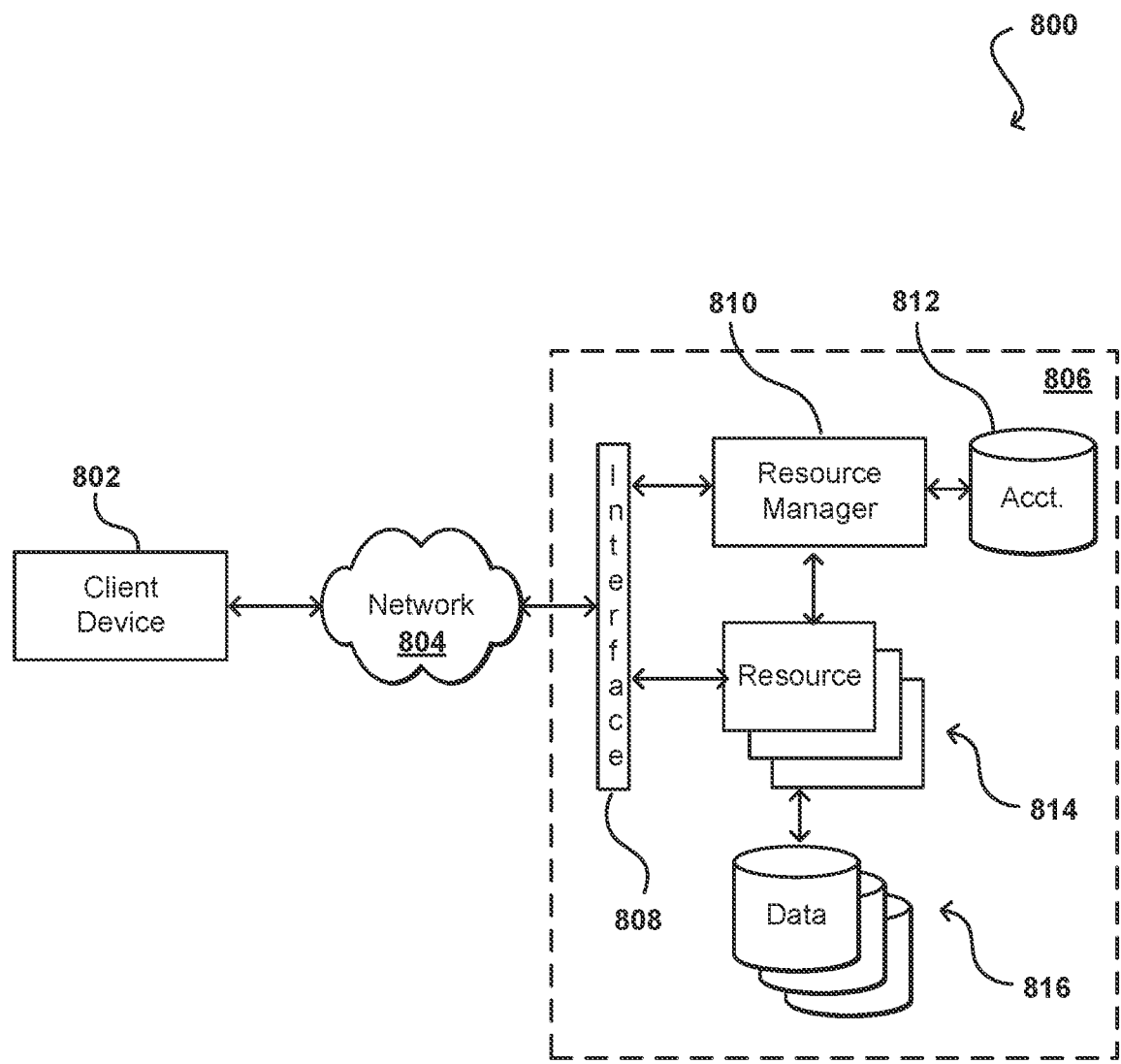
FIG. 8 illustrates components of another example environment in which aspects of various embodiments can be implemented.

As mentioned, such a configuration can be used in some embodiments to provide resource capacity for one or more users or customers as part of a shared resource environment. FIG. 8 illustrates an example of one such environment 800 in which aspects of the various embodiments can be implemented. In this example a user is able to utilize a client device 802 to submit requests across at least one network 804 to a multi-tenant resource provider environment 806. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 804 can include any appropriate network, including an intranet, the Internet, a cellular network, a local area network (LAN), or any other such network or combination, and communication over the network can be enabled via wired and/or wireless connections. The resource provider environment 806 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 814 of one or more types. These types can include, for example, application servers operable to process instructions provided by a user or database servers operable to process data stored in one or more data stores 816 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 814 can submit a request that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like.

When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes.

The resource manager 810 (or another such system or service) in this example can also function as a virtual layer of hardware and software components that handles control functions in addition to management actions, as may include provisioning, scaling, replication, etc. The resource manager can utilize dedicated APIs in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
observing, using a plurality of network devices, instances of traffic flow in a backbone network;
determining a direction for traffic flow for individual ones of the instances of the traffic flow;
analyzing the instances of the traffic flow, using a deduplication algorithm and based in part on the direction of traffic flow, to determine a subset of instance data to retain, wherein duplicate data to the subset of the instance data is discarded; and
determining usage of the backbone network for the traffic flow attributed to one or more services based in part on the subset of the instance data that is retained.

2. The computer-implemented method of claim 1, further comprising:
enabling a link layer to be associated with the backbone network, wherein the observing of the instances of the traffic flow in the backbone network includes the link layer.

3. The computer-implemented method of claim 1, further comprising:
determining the direction of traffic flow based in part on source and destination addresses reported in a session.

4. The computer-implemented method of claim 1, further comprising:
determining to retain the subset of the instance data for the instances of traffic flow received from a data center and observed by a respective aggregation device; and
determining to discard a second subset of the instance data for the instances of traffic flow received from the data center to the respective aggregation device and observed by a respective transit device.

5. The computer-implemented method of claim 1, further comprising:
determining to retain the subset of the instance data for the instances of traffic flow within the backbone network only for a respective network device in a same region as an origin or a destination of the instances of traffic flow.

6. A system comprising at least one processor and memory having instructions that when executed by the at least one processor cause the system to:
observe, using a plurality of network devices, instances of traffic flow in a backbone network;
determine a direction for traffic flow for individual ones of the instances of the traffic flow;
analyze the instances of the traffic flow, using a deduplication algorithm and based in part on the direction of traffic flow, to determine a subset of instance data to retain, wherein duplicate data to the subset of the instance data is discarded; and
determine usage of the backbone network for the traffic flow attributed to one or more services based in part on the subset of the instance data that is retained.

7. The system of claim 6, wherein the instructions, when executed by the at least one processor, further cause the system to:
enable a link layer to be associated with the backbone network, wherein the observing of the instances of the traffic flow in the backbone network includes the link layer.

8. The system of claim 6, wherein the instructions, when executed by the at least one processor, further cause the system to:
determine the direction of traffic flow based in part on source and destination addresses reported in a session.

9. The system of claim 6, wherein the instructions, when executed by the at least one processor, further cause the system to:
determine to retain the subset of the instance data for the instances of traffic flow received from a data center and observed by a respective aggregation device receiving the instances of traffic flow; and
determine to discard a second subset of the instance data for the instances of traffic flow received from the data center to the respective aggregation device and observed by a respective transit device.

10. The system of claim 6, wherein the instructions, when executed by the at least one processor, further cause the system to:
utilize mapping data to determine, based at least in part upon source and destination addresses from at least one of the plurality of network devices, services associated with the instances of network traffic.

11. The system of claim 10, wherein the instructions, when executed by the at least one processor, further cause the system to:
allocate cost portions to the services based at least in part upon portions of the instances of network traffic determined to be associated with the services.

12. The system of claim 6, wherein the instructions, when executed by the at least one processor, further cause the system to:
optimize for future traffic flow through at least part of the backbone network based at least in part upon the usage determined for the backbone network.

13. The system of claim 6, wherein the instructions, when executed by the at least one processor, further cause the system to:
modify a region associated with one or more of the instances of traffic flow based at least in part upon a device region of a network device observing the one or more of the instances of traffic flow.

14. The system of claim 6, wherein the instructions, when executed by the at least one processor, further cause the system to:
combine segment-specific usage data with the subset of the instance data that is retained, the combination to proportionally allocate usage of the backbone network by services associated with the instances of traffic flow.

15. The system of claim 6, wherein the instructions, when executed by the at least one processor, further cause the system to:
determine to retain the subset of the flow data for the instances of traffic flow received from an external network and observed by a transit device; and
determine to discard a second subset of the instance data for the instances of traffic flow received from the data center to the respective aggregation device and observed by a respective transit device.

16. The system of claim 6, wherein the instructions, when executed by the at least one processor, further cause the system to:
determine to retain the subset of the flow data for the instances of traffic flow within the network only for a respective network device in a same region as an origin or a destination of the instances of traffic flow.

17. The system of claim 6, wherein the instructions, when executed by the at least one processor, further cause the system to:

determine to retain the subset of flow data while at least a portion of the instances of traffic flow is being transmitted within the network.

18. A non-transitory computer-readable medium comprising instructions that, when executed by at least one processor, cause the at least one processor to:

observe, using a plurality of network devices, instances of traffic flow in a backbone network;

determine a direction for traffic flow for individual ones of the instances of the traffic flow;

analyze the instances of the traffic flow, using a deduplication algorithm and based in part on the direction of traffic flow, to determine a subset of instance data to retain, wherein duplicate data to the subset of the instance data is discarded; and determine usage of the backbone network for the traffic flow attributed to one or more services based in part on the subset of the instance data that is retained.

19. The non-transitory computer-readable medium of claim 18, where the instructions, when executed by at least one processor, further cause the at least one processor to:

enable a link layer to be associated with the backbone network, wherein the observing of the instances of the traffic flow in the backbone network includes the link layer.

20. The non-transitory computer-readable medium of claim 18, where the instructions, when executed by at least one processor, further cause the at least one processor to:

determine the direction of traffic flow based in part on source and destination addresses reported in a session.

* * * * *